(12) United States Patent
Chen et al.

(10) Patent No.: US 10,671,078 B2
(45) Date of Patent: Jun. 2, 2020

(54) METHOD, APPARATUS AND MEDIUM FOR CONTROLLING SELF BALANCING SCOOTER

(71) Applicant: Beijing Xiaomi Mobile Software Co., Ltd., Haidian District, Beijing (CN)

(72) Inventors: Shuai Chen, Beijing (CN); Tiejun Liu, Beijing (CN); Xiangyang Zhang, Beijing (CN)

(73) Assignee: BEIJING XIOMI MOBILE SOFTWARE CO., LTD., Beijing (CN)

(*) Notice: Subject to any disclaimer, the term of this patent is extended or adjusted under 35 U.S.C. 154(b) by 163 days.

(21) Appl. No.: 15/609,029

(22) Filed: May 31, 2017

(65) Prior Publication Data
US 2018/0059673 A1 Mar. 1, 2018

(30) Foreign Application Priority Data
Aug. 23, 2016 (CN) .......................... 2016 1 0710898

(51) Int. Cl.
| | |
|---|---|
| *G05D 1/02* | (2020.01) |
| *B62K 11/00* | (2006.01) |
| *G01C 21/36* | (2006.01) |
| *G06K 9/00* | (2006.01) |
| *B62J 45/40* | (2020.01) |

(52) U.S. Cl.
CPC .......... *G05D 1/0223* (2013.01); *B62K 11/007* (2016.11); *G01C 21/3602* (2013.01); *G05D 1/0234* (2013.01); *G05D 1/0242* (2013.01); *G05D 1/0246* (2013.01); *G05D 1/0255* (2013.01); *B62J 45/40* (2020.02); *G06K 9/00798* (2013.01)

(58) Field of Classification Search
CPC .. G05D 1/0223; G05D 1/0242; G05D 1/0255; G05D 1/0246; G05D 1/0234; B62K 11/007; G01C 21/3602; G01C 21/3415; G01C 21/20; B62J 2099/002; B62J 45/40; G06K 9/00798; G08G 1/00
See application file for complete search history.

(56) References Cited

U.S. PATENT DOCUMENTS 9,081,385 B1* 7/2015 Ferguson ........... G06K 9/00798
9,639,084 B2* 5/2017 Nakamura ........... G01S 3/8083
(Continued)

FOREIGN PATENT DOCUMENTS

| CN | 1387024 A | 12/2002 |
|---|---|---|
| CN | 101033981 A | 9/2007 |

(Continued)

OTHER PUBLICATIONS

Extended European Search Report for European application No. 17162432.3, dated Sep. 18, 2017.
(Continued)

*Primary Examiner* — Jason Holloway
(74) *Attorney, Agent, or Firm* — Jun He Law Offices P.C.

(57) ABSTRACT

A method, apparatus and medium for controlling a self-balancing scooter are provided. The method includes: detecting a target navigation marker used for navigating the self-balancing scooter; and controlling the self-balancing scooter to travel according to the target navigation marker when the target navigation marker is detected.

16 Claims, 11 Drawing Sheets

(56) References Cited

U.S. PATENT DOCUMENTS

| | | | |
|---|---|---|---|
| 2006/0037528 A1* | 2/2006 | Farritor | E01F 9/688 116/200 |
| 2007/0199108 A1* | 8/2007 | Angle | B25J 5/007 318/568.12 |
| 2008/0027599 A1* | 1/2008 | Logan | G05D 1/0234 701/23 |
| 2010/0246889 A1* | 9/2010 | Nara | G06K 9/00798 382/104 |
| 2013/0336537 A1* | 12/2013 | Reeves | G05D 1/0246 382/104 |
| 2016/0375592 A1* | 12/2016 | Szatmary | B25J 5/00 700/255 |
| 2017/0262712 A1* | 9/2017 | Chundrlik, Jr. | G08G 1/0962 |
| 2017/0282913 A1* | 10/2017 | Qian | G05D 1/0212 |

FOREIGN PATENT DOCUMENTS

| | | |
|---|---|---|
| CN | 101451849 A | 6/2009 |
| CN | 101482426 A | 7/2009 |
| CN | 101634563 A | 1/2010 |
| CN | 101660908 A | 3/2010 |
| CN | 101832780 A | 9/2010 |
| CN | 102508489 A | 6/2012 |
| CN | 102789234 A | 11/2012 |
| CN | 102818568 A | 12/2012 |
| CN | 102980572 A | 3/2013 |
| CN | 104122891 A | 10/2014 |
| CN | 204210654 U | 3/2015 |
| CN | 104637330 A | 5/2015 |
| CN | 104833364 A | 8/2015 |
| CN | 104932505 A | 9/2015 |
| CN | 105222773 A | 1/2016 |
| CN | 105223952 A | 1/2016 |
| CN | 105352521 A | 2/2016 |
| CN | 105810007 A | 7/2016 |
| EP | 2677274 A2 | 12/2013 |
| EP | 3147742 A2 | 3/2017 |
| JP | H1183530 A | 3/1999 |
| JP | 2004-118757 A | 4/2004 |
| JP | 2011-173453 A | 9/2011 |
| JP | 2013-12237 A | 1/2013 |
| RU | 2337034 C2 | 10/2008 |
| WO | 2005119177 A1 | 12/2005 |

OTHER PUBLICATIONS

The Office Action in Japanese patent application No. 2017-504688, dated Aug. 31, 2018.

International Search Report for International Application PCT/CN2016/107588, dated May 19, 2017.

Second Office Action of CN Application No. 201610710898.0 dated May 25, 2018.

* cited by examiner

METHOD, APPARATUS AND MEDIUM FOR CONTROLLING SELF BALANCING SCOOTER

CROSS REFERENCE TO RELATED APPLICATIONS

The present application is based on and claims the priority of Chinese Patent Application No. CN201610710898.0, filed Aug. 23, 2016, the entire contents of which are incorporated herein by reference.

TECHNICAL FIELD

The present disclosure relates to the field of self-balancing scooter technology and, particularly, to a method, apparatus and medium for controlling a self-balancing scooter.

BACKGROUND

Currently, more and more users are using a self-balancing scooter instead of walk. However, riding a self-balancing scooter is not allowable in some areas for the sake of safety, so a user may need to drag the self-balancing scooter by hand if he wants to move it to a place in these areas, which brings troubles to the user's operation and requires a lot of physical strength.

SUMMARY

A method, apparatus and medium for controlling a self-balancing scooter are provided by embodiments of the present disclosure.

According to a first aspect of the embodiments of the present disclosure, a method for controlling a self-balancing scooter is provided. The method includes: detecting a target navigation marker used for navigating the self-balancing scooter; and controlling the self-balancing scooter to travel according to the target navigation marker when the target navigation marker is detected.

According to a second aspect of the embodiments of the present disclosure, an apparatus for controlling a self-balancing scooter is provided. The apparatus includes: a processor; and a memory configured to store an instruction executable by the processor; wherein the processor is configured to: detect a target navigation marker used for navigating the self-balancing scooter; and control the self-balancing scooter to travel according to the navigation marker when the target navigation marker is detected.

According to a third aspect of the embodiments of the present disclosure, there is provided a non-transitory computer-readable storage medium having stored therein instructions that, when executed by a processor of a smart terminal device, causes the smart terminal device to perform a method for controlling a self-balancing scooter. The non-transitory computer-readable storage medium includes: detecting a target navigation marker used for navigating the self-balancing scooter; and controlling the self-balancing scooter to travel according to the target navigation marker when the target navigation marker is detected.

It should be understood that the above general description and the detailed description below are merely exemplary, and do not limit the present disclosure.

BRIEF DESCRIPTION OF THE DRAWINGS

The accompanying drawings are incorporated in and constitute a part of this specification, illustrate embodiments conforming to the disclosure and together with the description serve to explain the principles of the disclosure.

DETAILED DESCRIPTION

Descriptions will now be made in detail to exemplary embodiments, examples of which are illustrated in the accompanying drawings. When accompanying figures are mentioned in the following descriptions, the same numbers in different drawings represent the same or similar elements, unless otherwise represented. The implementations set forth in the following description of exemplary embodiments do not represent all implementations consistent with the invention. Instead, they are merely examples of apparatus and methods consistent with aspects related to the disclosure as recited in the appended claims.

Figure 1A:
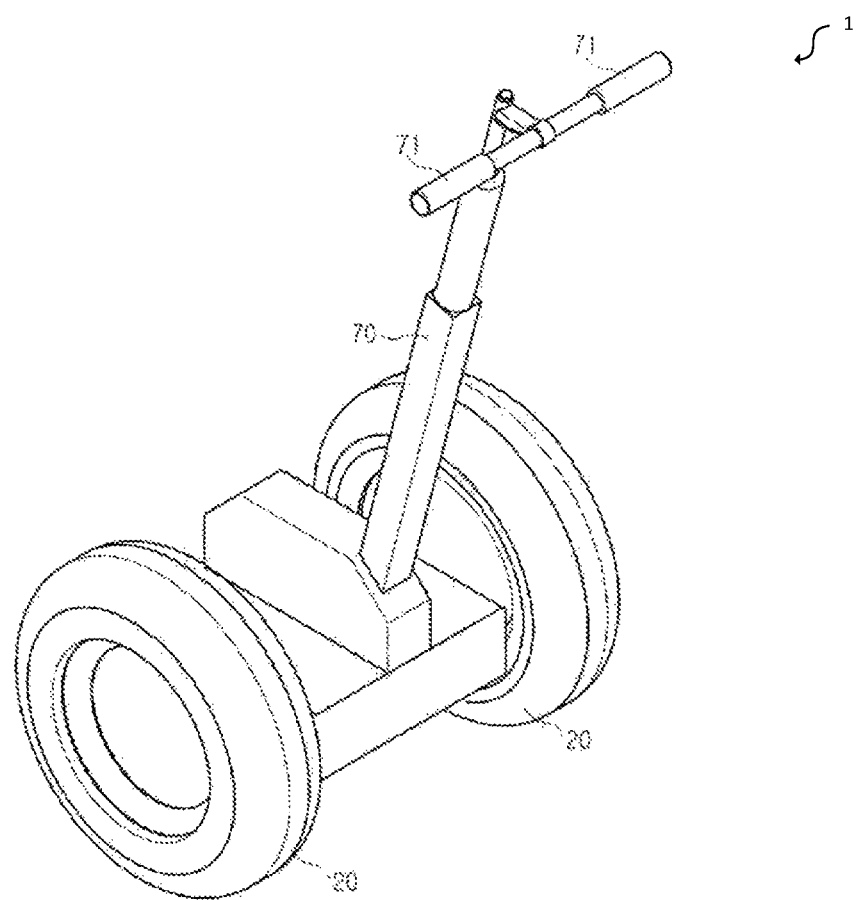
FIG. 1a is a perspective view illustrating an exemplary self-balancing scooter according to an embodiment of the present application.

FIG. 1a is a perspective view illustrating an exemplary self-balancing scooter 1 according to an embodiment of the present application. It's the knowledge known to a person skilled in the art before the filing date of the present application that a self-balancing scooter (also hoverboard, self-balancing board) is a self-balancing personal transporter. For example, a self-balancing scooter may consist of e.g. two motorized wheels connected to a pair of articulated pads on which the rider places their feet. The rider controls the speed by leaning forwards or backwards, and direction of travel by twisting the pads.

Currently, more and more users are using a self-balancing scooter instead of walking. However, riding a self-balancing scooter is not allowable in some areas for the sake of safety, so a user may need to drag the self-balancing scooter by hand if he wants to move it to a place in these areas, which brings troubles to the user's operation and requires a lot of physical strength.

Embodiments of the present disclosure provide a method for controlling a self-balancing scooter. The method can be used in a program, a system or an apparatus for controlling the self-balancing scooter, while an executive subject to which the method is applied may be a self-balancing scooter or a terminal connected with the self-balancing scooter.

Figure 1:
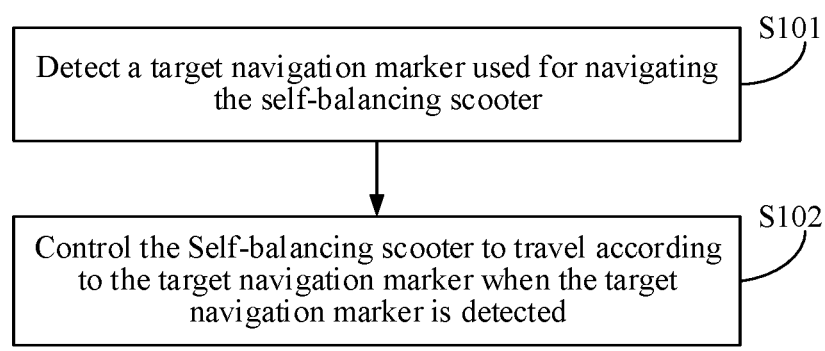
FIG. 1 is a flowchart illustrating a method for controlling a self-balancing scooter according to an exemplary embodiment.

The embodiment of the present disclosure provides a method for controlling a self-balancing scooter. Referring to FIG. 1, FIG. 1 is a flowchart illustrating a method for controlling a self-balancing scooter according to an exemplary embodiment.

As shown in FIG. 1, the method includes step S101 to step S102

In the step S101, a target navigation marker used for navigating the self-balancing scooter is detected.

In an embodiment, the target navigation marker includes one or more of a graphic navigation marker, an audio navigation marker, a video navigation marker and an infrared navigation marker, and is used to indicate at least one of a traveling direction and a traveling speed of the self-balancing scooter.

In the step S102, when the target navigation marker is detected, the self-balancing scooter is controlled to travel according to the target navigation marker.

By detecting a target navigation marker used for navigating the self-balancing scooter, the self-balancing scooter can be controlled intelligently to travel according to the target navigation marker when the target navigation marker is detected, without requiring a user to ride the self-balancing scooter, so that an intelligent control to the self-balancing scooter can be realized. Accordingly, the user does not need to drag the self-balancing scooter by hand if he cannot ride the self-balancing scooter, thereby bringing convenience to the user.

The embodiment of the present disclosure provides a method for detecting a target navigation marker that is used for navigating the self-balancing scooter. The method further details the step S101 illustrated in FIG. 1.

Figure 2:
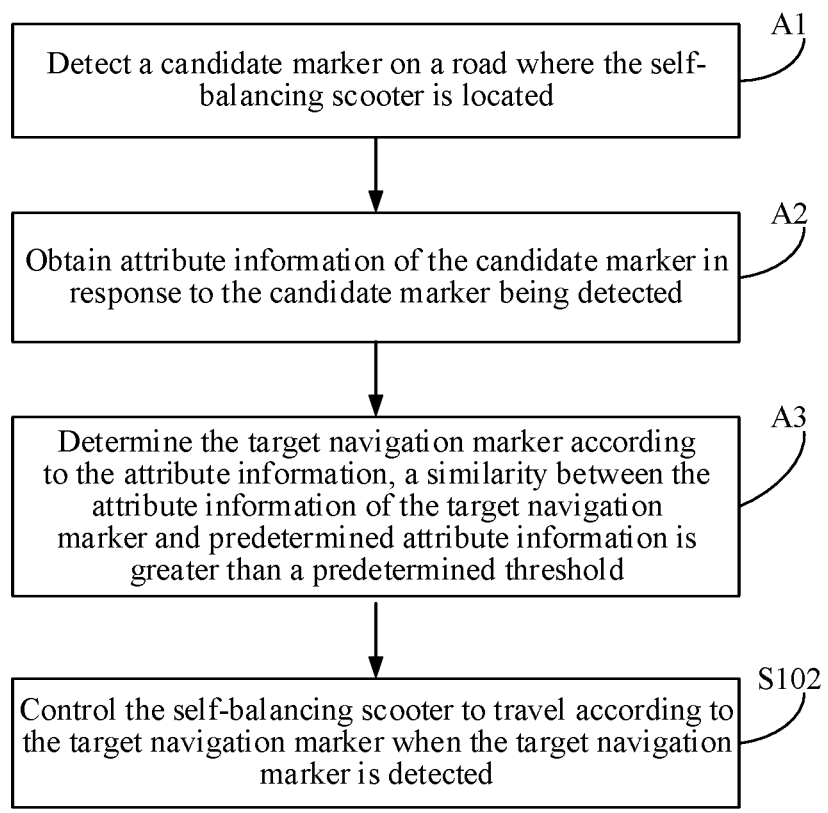
FIG. 2 is a flowchart illustrating that a target navigation marker used for navigating a self-balancing scooter is detected according to an exemplary embodiment.

Referring to FIG. 2, FIG. 2 is a flowchart illustrating a process of detecting a target navigation marker used for navigating a self-balancing scooter according to an exemplary embodiment.

As shown in FIG. 2, the step S101 illustrated in FIG. 1, i.e. the target navigation marker used for navigating the self-balancing scooter is detected, is implemented through the following steps.

In step A1, a candidate marker on a road where the self-balancing scooter is located at is detected.

The candidate marker can be all kinds of markers, such as various lines and icons, painted on the road that may represent the navigation marker.

In step A2, an attribute information of the candidate marker is obtained in response to the candidate marker being detected.

The attribute information is used to represent all kinds of attributes of the candidate marker, such as location being set, color, length and width.

In step A3, the target navigation marker is determined according to the attribute information, wherein a similarity between the attribute information of the target navigation marker and a predetermined attribute information is greater than a predetermined threshold. In an embodiment, the predetermined attribute information includes standard attribute information of the target navigation marker that is preset in advance.

Some interfering objects may be present on the road where the self-balancing scooter is located at, or multiple navigation markers with different attribute information can be provided on the road. Thus, the candidate marker on the road where the self-balancing scooter is located at can be detected first when the target navigation marker is being detected. After the candidate marker is detected, a desired target navigation marker can be determined from the candidate marker.

For instance, an example of obtaining a yellow navigation marker is provided. A candidate marker on the road where the self-balancing scooter is located at is detected. The attribute information of the candidate marker is obtained in response to the candidate marker being detected, that is, the color of the candidate marker is obtained. A color similarity between the color of the candidate marker and yellow is obtained, and then the candidate marker with color similarity greater than a predetermined threshold is obtained and determined as the target navigation marker.

Moreover, if there are multiple candidate markers having the similarity between their attribute information and the predetermined attribute information being greater than the predetermined threshold, the candidate marker with maximum similarity among the multiple candidate markers can be determined as the target navigation marker.

In an embodiment, the target navigation marker includes at least one of a graphic navigation marker, an audio navigation marker, a video navigation marker and an infrared navigation marker.

The target navigation marker may indicate at least one of a traveling direction and a traveling speed.

The target navigation marker includes at least one of above described markers, which enriches the navigation mark, so that the self-balancing scooter can travel according to different types of navigation markers. Moreover, the target navigation marker can indicate at least one of the traveling direction and the traveling speed, thus the self-balancing scooter can be controlled intelligently to travel according to the indicated traveling direction and indicated traveling speed, thereby bringing convenience to the user.

Moreover, the traveling speed can be low to ensure traveling safety. If the traveling speed is lower than or equal to the user's walking speed, the self-balancing scooter can follow the user and travel automatically according to the target navigation marker.

The embodiment of the present disclosure provides another method for detecting a target navigation marker used for navigating the self-balancing scooter, which further details the step S101 illustrated in FIG. 1. In the method, the target navigation marker includes a graphic navigation marker, and the self-balancing scooter is provided with a camera, which can be installed on any place on the self-balancing scooter, such as on a base of the self-balancing scooter.

Figure 3:
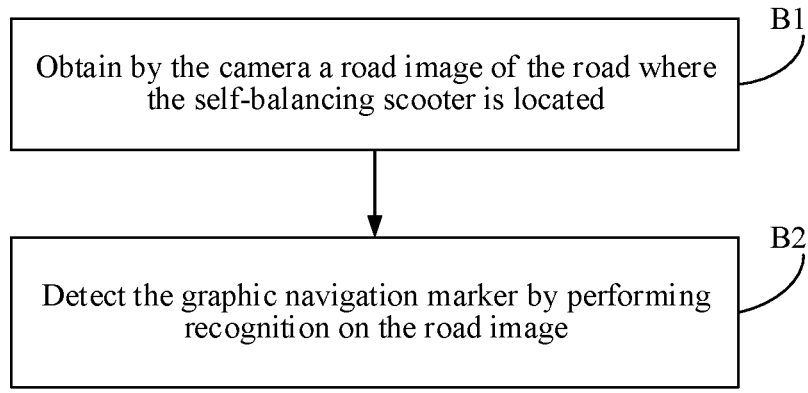
FIG. 3 is a flowchart illustrating that a target navigation marker used for navigating a self-balancing scooter is detected according to another exemplary embodiment.

Referring to FIG. 3, FIG. 3 is a flowchart illustrating process of detecting a target navigation marker used for navigating a self-balancing scooter according to another exemplary embodiment.

As shown in FIG. 3, the step S101 illustrated in FIG. 1, i.e., the target navigation marker used for navigating the self-balancing scooter is detected, is implemented through the following steps.

In step B1, a road image of a road where a self-balancing scooter is located at is obtained by the camera.

In step B2, a graphic navigation marker is detected by performing recognition on the road image.

If the target navigation marker includes the graphic navigation marker and the self-balancing scooter is provided with a camera, when obtaining the graphic navigation marker, the road where the self-balancing scooter is located at can be captured by the camera to obtain the road image, and then recognition can be performed for the road image, thus the graphic navigation marker on the road can be detected accurately.

Moreover, the self-balancing scooter may be also provided with a lighting device such as a lamp. When obtaining the road image, the lighting device can be turned on if current ambient brightness is lower than a predetermined ambient brightness, so that the current ambient brightness can be adjusted higher than or equal to the predetermined ambient brightness. Thus, the road image with high resolution and definition can still be captured under low ambient brightness, and it takes the advantages that better recognition can be performed for the road image so as to detect the graphic navigation marker accurately.

In an embodiment, the graphic navigation marker includes at least one of a navigation icon on a road, a navigation icon on a signpost and a navigation icon on a building near a road.

The graphic navigation marker on the road where the self-balancing scooter is located at can be at least one of a navigation marker painted on the road, a navigation marker on a signpost near the road (for example both sides of the road) and a navigation marker on a building near the road (for example on the wall of a building along the road). The navigation marker can include a navigation line, a navigation guidance arrow, an icon, characters, and the like.

In an embodiment, the target navigation marker includes a navigation icon on a road, and the navigation icon on the road includes a navigation line on the road.

The attribute information includes at least one of location being set, color, length and width.

The graphic navigation icon on the road can include a navigation line on the road and the attribute information can include at least one of location being set, color, length and width. Accordingly, when the target navigation marker is determined according to the attribute information, the similarity between the attribute information and the predetermined attribute information can be derived by determining whether the location of the candidate marker is within a preset location, whether the color of the candidate marker is same with a preset color, whether a continuous length of the candidate marker exceeds a preset length, or whether a width of the candidate marker exceeds a preset width, or the like. Then the target navigation marker can be determined accurately according to the attribute information of the candidate marker.

The embodiment of the present disclosure provides a method for controlling a self-balancing scooter to travel according to a target navigation marker, which further details the step S102 illustrated in FIG. 1.

The step S102 illustrated in FIG. 1, i.e., the self-balancing scooter is controlled to travel according to the target navigation marker, is implemented through the following steps.

The self-balancing scooter is controlled to travel according to a navigation line on the road, and the navigation line can be navigation lines of various colors, e.g. white, black, red and the like, that painted in advance.

When the self-balancing scooter is controlled to travel according to the target navigation marker, if the target navigation marker includes a navigation line on the road, the self-balancing scooter can be controlled intelligently to travel according to the navigation line on the road, so that the navigation line on the road can navigate the self-balancing scooter.

Figure 4:
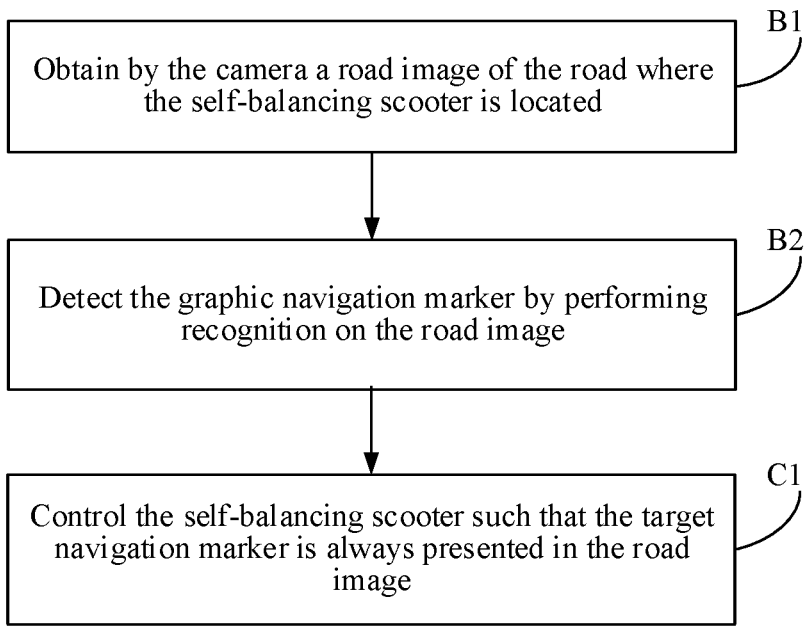
FIG. 4 is a flowchart illustrating that a self-balancing scooter is controlled to travel according to a target navigation marker according to an exemplary embodiment.

Referring to FIG. 4, FIG. 4 is a flowchart illustrating process of controlling a self-balancing scooter to travel according to a target navigation marker in accordance with an exemplary embodiment.

As shown in FIG. 4, in an embodiment, the step S102 illustrated in FIG. 1, i.e., the self-balancing scooter is controlled to travel according to the target navigation marker, is implemented through the following steps.

In step C1, the self-balancing scooter is controlled such that the target navigation marker is always presented in the road image captured by the camera of the scooter.

The self-balancing scooter can be controlled to travel according to the target navigation marker such that the target navigation marker is always presented in the road image. Thus, it's ensured that the self-balancing scooter can travel automatically without deviating from the target navigation marker.

Moreover, when the self-balancing scooter is controlled such that the target navigation marker is always presented in the road image, it's preferred that the target navigation marker is always presented in the middle of the road image. As a result, it can be sufficiently ensured that the self-balancing scooter can travel without deviating from the target navigation marker.

In an embodiment, if the target navigation marker includes an audio navigation marker, a video navigation marker and an infrared navigation marker respectively, these navigation markers can be detected by the self-balancing scooter via a signal sent by a target device, which can be a device being in wired or wireless connection with the self-balancing scooter and located at any place. The target device may interact with the self-balancing scooter and send an audio signal including an audio navigation marker, a video signal including a video navigation marker or an infrared signal including an infrared navigation marker to the self-balancing scooter, so that the audio navigation marker can be detected by performing recognition on the received audio signal, the video navigation marker can be detected by performing recognition on the received video signal, the infrared navigation marker can be detected by performing recognition on the received infrared signal. Then, the self-balancing scooter can travel according to the detected audio navigation marker, the detected video navigation marker, or the detected infrared navigation marker. For instance, the target device can be positioned at the road where the self-balancing scooter is located at, and send an infrared signal including an infrared navigation marker or an audio signal including an audio navigation marker to the self-balancing scooter when the self-balancing scooter is detected to be approaching, so that recognition can be performed on the infrared signal and audio signal by the self-balancing scooter, then the infrared navigation marker or the audio navigation marker can be detected, and the self-balancing scooter can travel according to the infrared navigation marker or the audio navigation marker.

To allow the user to learn about these markers, these makers can be output by means of audio, text or image.

In an embodiment, the graphic navigation marker can also be output by means of displaying an image on a device.

The embodiment of the present disclosure provides another method for controlling the self-balancing scooter to travel according to a target navigation marker, which further details the step S102 illustrated in FIG. 1.

Figure 5:
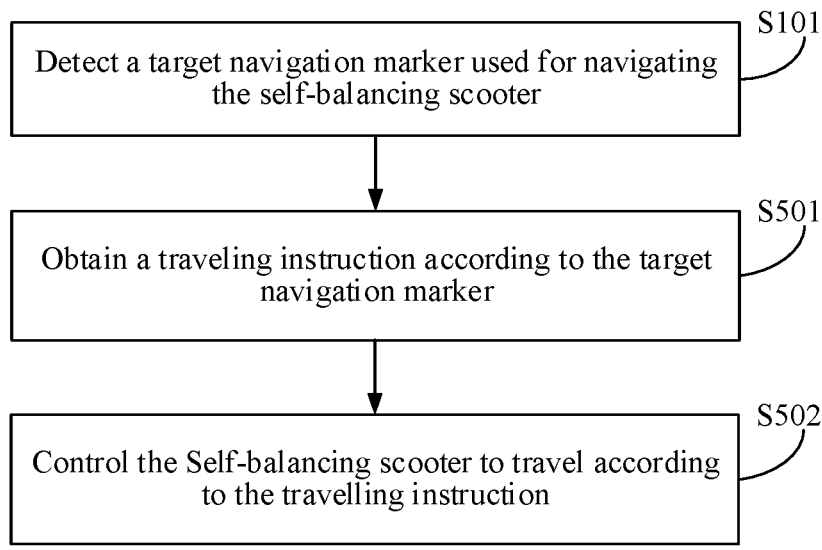
FIG. 5 is a flowchart illustrating that a self-balancing scooter is controlled to travel according to a target navigation marker according to another exemplary embodiment.

Referring to FIG. 5, FIG. 5 is a flowchart illustrating a process of controlling a self-balancing scooter to travel according to a target navigation marker according to another exemplary embodiment.

As shown in FIG. 5, the step S102 illustrated in FIG. 1, i.e., the self-balancing scooter is controlled to travel according to the target navigation marker, is implemented through the following steps.

In step 501, a travelling instruction is obtained according to the target navigation marker.

In step 502, the self-balancing scooter is controlled to travel according to the travelling instruction, which is used to indicate at least one of a traveling direction and a traveling speed of the self-balancing scooter.

When the self-balancing scooter is controlled to travel according to the target navigation marker, a travelling instruction can be obtained according to the target navigation marker, and then the self-balancing scooter can be controlled intelligently to travel automatically according to the travelling instruction.

In an embodiment, a detailed process for obtaining the travelling instruction is described as follows.

When the target navigation marker includes a graphic navigation marker, the travelling instruction can be obtained by performing graph recognition on the graphic navigation marker. For instance, the travelling direction can be obtained by performing recognition on the direction where a guidance arrow in the graphic navigation marker is pointed to, and the travelling speed can be obtained by performing recognition on a speed limit sign in the graphic navigation marker.

When the target navigation marker includes an audio navigation marker, the travelling instruction can be obtained by performing audio recognition on the audio navigation marker. For instance, the travelling direction can be obtained by performing recognition on voice information (for example, the voice information indicative of turning left or turning right) used to indicate a direction in the audio navigation marker by means of voice recognition technology, and the travelling speed can be obtained by performing recognition on voice information (for example, a maximum speed of the self-balancing scooter is XX meter per second) used to indicate speed in the audio navigation marker by means of voice recognition technology.

When the target navigation marker includes a video navigation marker, the travelling instruction can be obtained by performing audio recognition or graph recognition on the video navigation marker. For instance, the travelling direction can be obtained by performing recognition on voice information or image (for example, characters including a indicated direction or an image including a guidance arrow) used to indicate a direction in the video navigation marker, and the travelling speed can be obtained by performing recognition on voice information or image (for example, an image including speed) used to indicate a speed in the video navigation marker.

When the target navigation marker includes an infrared navigation marker, the travelling instruction can be obtained by performing infrared recognition on the infrared navigation marker. For instance, the travelling direction can be obtained by performing recognition on infrared signals used to indicate a direction in the infrared navigation marker, and the travelling speed can be obtained by performing recognition on infrared signals used to indicate speed in the infrared navigation marker.

The embodiment of the present disclosure provides another method for controlling the self-balancing scooter to travel according to a target navigation marker, which further details the step S102 illustrated in FIG. 1.

Figure 6:
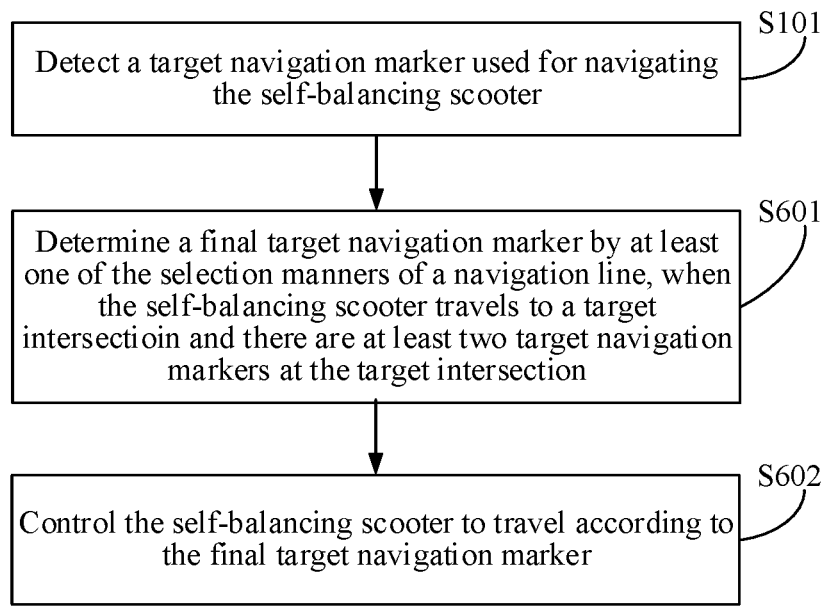
FIG. 6 is a flowchart illustrating that a self-balancing scooter is controlled to travel according to a target navigation marker according to still another exemplary embodiment.

Referring to FIG. 6, FIG. 6 is a flowchart illustrating that a self-balancing scooter is controlled to travel according to a target navigation marker according to still another exemplary embodiment.

As shown in FIG. 6, the step S102 illustrated in FIG. 1, i.e., the self-balancing scooter is controlled to travel according to the target navigation marker when the target navigation marker is detected, is implemented through the following steps.

In step S601, when the self-balancing scooter travels to a target intersection and there are at least two target navigation markers at the target intersection, a final target navigation marker can be determined by at least one of the following navigation line selection manners. Herein, the target intersection can be any intersection on the road where the self-balancing scooter is located at.

In step S602, the self-balancing scooter is controlled to travel according to the final target navigation marker.

The navigation line selection manners include:

The final target navigation marker can be determined according to a preset travelling direction corresponding to the target intersection, and the travelling direction that corresponds to the target intersection is a travelling direction preset according to a travelling destination of the self-balancing scooter.

When there are multiple target navigation markers at the target intersection, in order that the final target navigation marker can be determined accurately, according to the travelling direction corresponding to the target intersection, the target navigation marker indicating the travelling direction can be determined as the final target navigation marker. Then the self-balancing scooter can be controlled to travel automatically according to the target navigation marker including this travelling direction.

Alternatively, a selection instruction of travelling direction is received, and the final target navigation marker is determined according to the selection instruction of travelling direction.

When there are multiple target navigation markers at the target intersection, the target navigation marker that the user expects (that is, the target navigation marker is selected according to the selection instruction of travelling direction) can be selected as the final target navigation marker according to the selection instruction of travelling direction. Then, the self-balancing scooter can be navigated by the target navigation marker selected by the selection instruction of travelling direction, and travel automatically according to the travelling direction and travelling speed that the user expects.

Alternatively, it is determined that whether there is a prestored historical navigation line selection corresponding to the target intersection.

When there is a prestored historical navigation line selection record, the final target navigation marker can be determined according to the historical navigation line selection record.

When there are multiple target navigation markers at the target intersection, in order that the final target navigation marker can be determined accurately, it is determined that whether there is a prestored historical navigation line selection record corresponding to the target intersection. If yes, according to the historical navigation line selection record, the historical navigation marker which is used most frequently, used for the most number of times or used most recently can be determined as the final target navigation marker. Then the self-balancing scooter can be controlled to travel automatically according to the target navigation marker that is used most frequently or used most recently.

Moreover, the above embodiments can be implemented individually or in combination.

Figure 7:
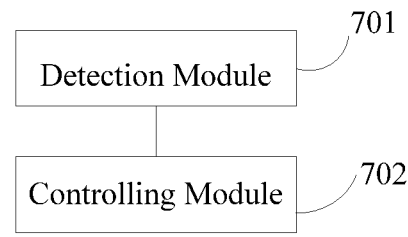
FIG. 7 is a block diagram illustrating an apparatus for controlling a self-balancing scooter according to an exemplary embodiment.

The above embodiments disclose methods of controlling a self-balancing scooter. Corresponding to the methods for controlling a self-balancing scooter disclosed above, the present disclosure also provides an apparatus for controlling a self-balancing scooter. Referring to FIG. 7, FIG. 7 is a block diagram illustrating an apparatus for controlling a self-balancing scooter according to an exemplary embodiment.

As shown in FIG. 7, the apparatus includes: a detection module 701 configured to detect a target navigation marker used for navigating the self-balancing scooter; and a controlling module 702 configured to control the self-balancing scooter to travel according to the target navigation marker when the target navigation marker is detected by the detection module 701.

The present disclosure provides a detection module which further details the detection module illustrated in FIG. 7.

Figure 8:
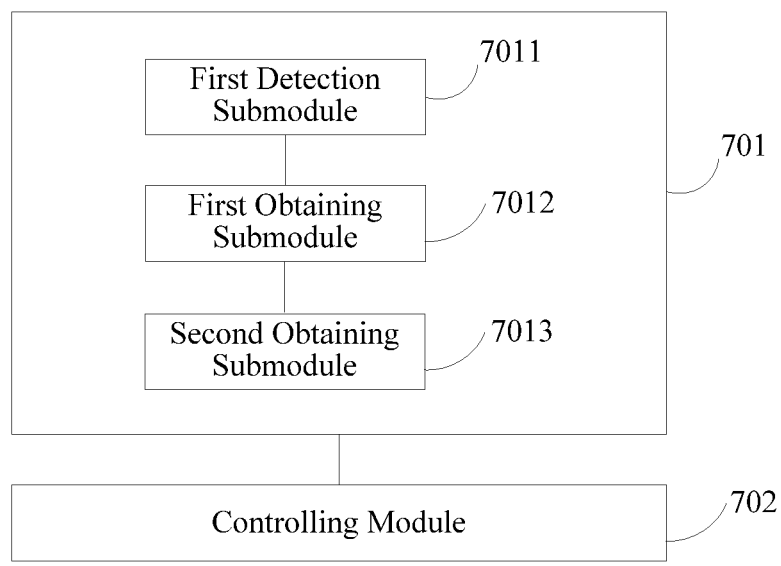
FIG. 8 is a block diagram illustrating a detecting module according to an exemplary embodiment.

Referring to FIG. 8, FIG. 8 is a block diagram illustrating a detecting module according to an exemplary embodiment.

As shown in FIG. 8, the detection module 701 includes: a first detection sub-module 7011 configured to detect a candidate marker on a road where the self-balancing scooter is located at; a first obtaining sub-module 7012 configured to obtain attribute information of the candidate marker in response to the candidate marker being detected by the first detection sub-module 7011; and a second obtaining sub-module 7013 configured to obtain the target navigation marker according to the attribute information obtained by the first obtaining sub-module 7012, wherein a similarity between the attribute information of the target navigation marker and a predetermined attribute information is greater than a predetermined threshold.

In an embodiment, the target navigation marker includes at least one of a graphic navigation marker, an audio navigation marker, a video navigation marker and an infrared navigation marker.

The target navigation marker may indicate at least one of a traveling direction and a traveling speed.

The present disclosure provides another detection module which further details the detection module illustrated in FIG. 7.

Figure 9:
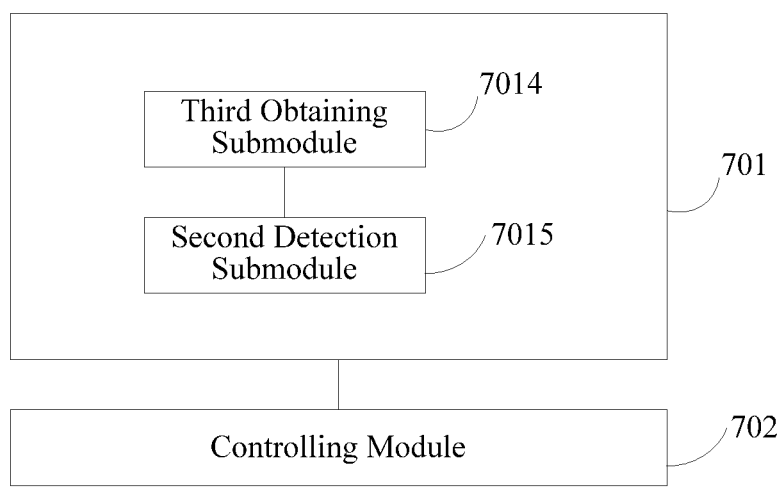
FIG. 9 is a block diagram illustrating a detecting module according to another exemplary embodiment.

Referring to FIG. 9, FIG. 9 is a block diagram illustrating another detecting module according to an exemplary embodiment.

As shown in FIG. 9, the target navigation marker includes the graphic navigation marker, and the self-balancing scooter is provided with a camera.

The detection module 701 illustrated FIG. 7 includes: a third obtaining sub-module 7014 configured to obtain by the camera a road image of a road where the self-balancing scooter is located at; and a second detection sub-module 7015 configured to detect the graphic navigation marker by performing recognition on the road image obtained by the third obtaining sub-module 7014.

In an embodiment, the graphic navigation marker may include at least one of a navigation icon on the road, a navigation icon on a signpost and a navigation icon on a building near the road.

In an embodiment, the target navigation marker may include at least one of a navigation icon on a road, the navigation icon on the road includes a navigation line on the road.

The attribute information may include at least one of location being set, color, length and width.

The present disclosure provides a controlling module which further details the controlling module illustrated in FIG. 9.

Figure 10:
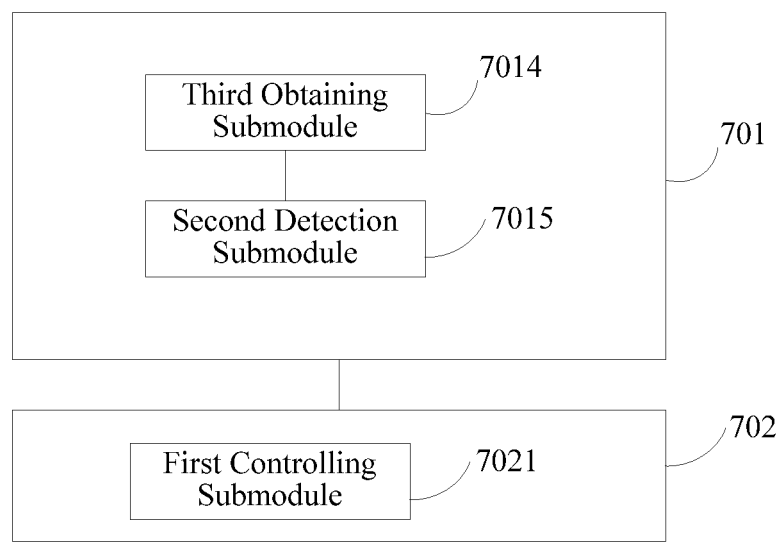
FIG. 10 is a block diagram illustrating a controlling module according to an exemplary embodiment.

Referring to FIG. 10, FIG. 10 is a block diagram illustrating a controlling module according to an exemplary embodiment.

As shown in FIG. 10, the controlling module illustrated 702 in FIG. 9 includes: a first controlling sub-module 7021 configured to control the self-balancing scooter to travel along a navigation line on the road.

The present disclosure provides another controlling module which further details the controlling module illustrated in FIG. 9.

Figure 11:
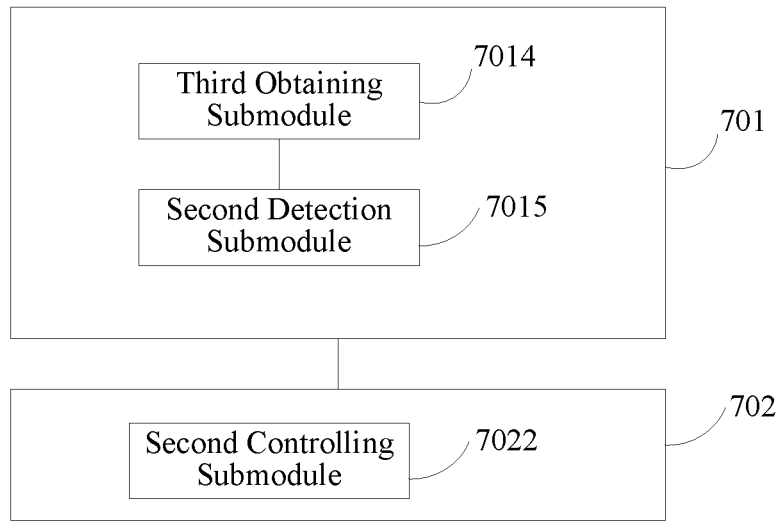
FIG. 11 is a block diagram illustrating a controlling module according to another exemplary embodiment.

Referring to FIG. 11, FIG. 11 is a block diagram illustrating another controlling module according to an exemplary embodiment.

As shown in FIG. 11, the controlling module illustrated 702 in FIG. 9 includes: a second controlling sub-module 7022 configured to control the self-balancing scooter such that the target navigation marker is always presented in the road image obtained by the third obtaining sub-module.

The present disclosure provides another controlling module which further details the controlling module illustrated in FIG. 9.

Figure 12:
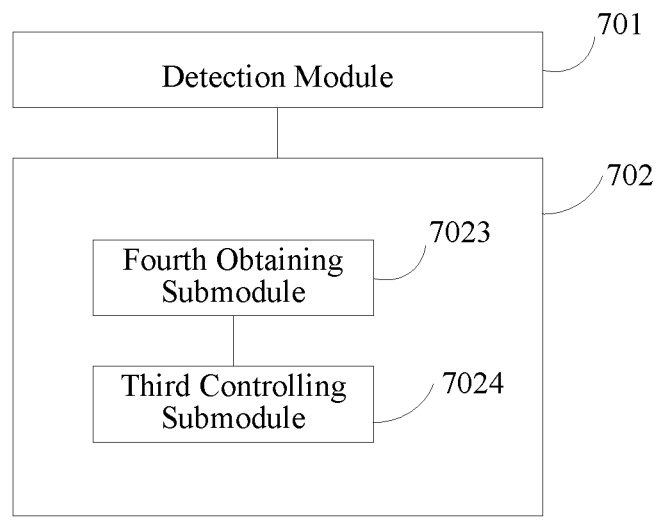
FIG. 12 is a block diagram illustrating a controlling module according to still another exemplary embodiment.

Referring to FIG. 12, FIG. 12 is a block diagram illustrating still another controlling module according to an exemplary embodiment.

As shown in FIG. 12, the controlling module illustrated 702 in FIG. 9 includes: a fourth obtaining sub-module 7023 configured to obtain a travelling instruction according to the target navigation marker detected by the detection module; and a third controlling sub-module 7024 configured to control the self-balancing scooter to travel according to the travelling instruction obtained by the fourth obtaining sub-module 7023.

The present disclosure provides another controlling module which further details the controlling module illustrated in FIG. 9.

Figure 13:
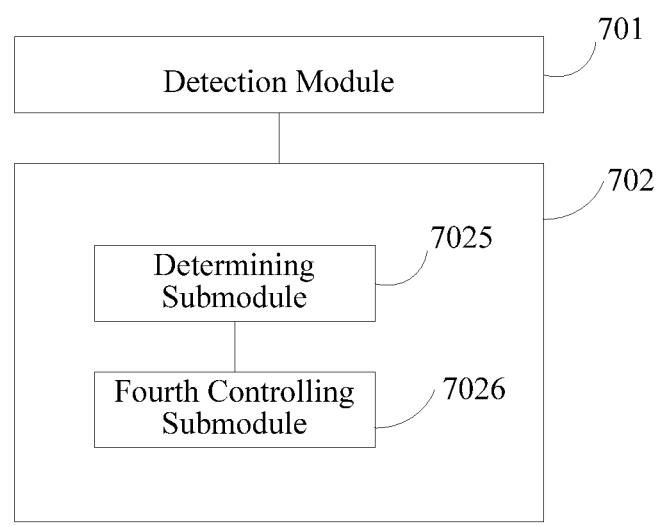
FIG. 13 is a block diagram illustrating a controlling module according to still yet another exemplary embodiment.

Referring to FIG. 13, FIG. 13 is a block diagram illustrating yet still another controlling module according to an exemplary embodiment.

As shown in FIG. 13, the controlling module 702 illustrated in FIG. 9 includes: a determination sub-module 7025 configured to determine a final target navigation marker by at least one of the following navigation line selection manners when the self-balancing scooter travels to a target intersection and there are at least two target navigation markers at the target intersection; and a fourth controlling sub-module 7026 configured to control the self-balancing scooter to travel according to the final target navigation marker determined by the determination sub-module 7025.

The navigation line selection manner may include:

The final target navigation marker may be determined according to a preset travelling direction corresponding to the target intersection.

Alternatively, a travelling direction selection instruction may be received, and the final target navigation marker can be determined according to the travelling direction selection instruction.

Alternatively, it is determined that whether there is a prestored historical navigation line selection record. When there is a prestored historical navigation line selection record, the final target navigation marker can be determined according to the historical navigation line selection record.

According to some embodiments of the disclosure, an apparatus for controlling a self-balancing scooter is provided and includes: a processor; and a memory configured to store an instruction executable by the processor; wherein the processor is configured to: detect a target navigation marker used for navigating the self-balancing scooter; and control the self-balancing scooter to travel according to the target navigation marker when the target navigation marker is detected.

The above described processor configured to detect a target navigation marker used for navigating the self-balancing scooter is further configured to: detect a candidate marker on a road where the self-balancing scooter is located; obtain attribute information of the candidate marker in response to the candidate marker being detected; and determine the target navigation marker according to the attribute information, wherein a similarity between the attribute information of the target navigation marker and predetermined attribute information is greater than a predetermined threshold.

In an embodiment, the target navigation marker includes at least one of a graphic navigation marker, an audio navigation marker, a video navigation marker and an infrared navigation marker; and the target navigation marker indicates at least one of a traveling direction and a traveling speed.

In an embodiment, the target navigation marker includes the graphic navigation marker, the self-balancing scooter is provided with a camera; and the processor configured to detect a target navigation marker used for navigating the self-balancing scooter is further configured to: obtain by the camera a road image of the road where the self-balancing scooter is located; and detect the graphic navigation marker by performing recognition on the road image.

In an embodiment, the graphic navigation marker includes at least one of a navigation icon on the road, a navigation icon on a signpost and a navigation icon on a building near the road.

In an embodiment, the target navigation marker includes the navigation icon on the road, the navigation icon on the road including a navigation line on the road; and the attribute information includes at least one of location being set, color, length and width.

The above described processor configured to control the self-balancing scooter to travel according to the target navigation marker is further configured to: control the self-balancing scooter to travel along the navigation line on the road.

The above described processor configured to control the self-balancing scooter to travel according to the target navigation marker is further configured to: control the self-balancing scooter such that the target navigation marker is always presented in the road image.

The above described processor configured to control the self-balancing scooter to travel according to the target navigation marker is further configured to: obtain a travelling instruction according to the target navigation marker; and control the self-balancing scooter to travel according to the travelling instruction.

The above described processor configured to control the self-balancing scooter to travel according to the target navigation marker, when the target navigation marker is detected, is further configured to: determine a final target navigation marker by at least one of the following selection manners of a navigation line when the self-balancing scooter travels to an target intersection and there are at least two target navigation markers at the target intersection; and control the self-balancing scooter to travel according to the final target navigation marker.

The selection of the navigation line may include following manners.

The final target navigation marker may be determined according to a preset travelling direction corresponding to the target intersection.

Alternatively, a selection instruction of travelling direction is received, and the final target navigation marker can be determined according to the selection instruction of travelling direction.

Alternatively, it is determined whether there is a prestored historical selected record of a navigation line. When there is a prestored historical selected record of a navigation line, the final target navigation marker can be determined according to the historical selected record of the navigation line.

Figure 14:
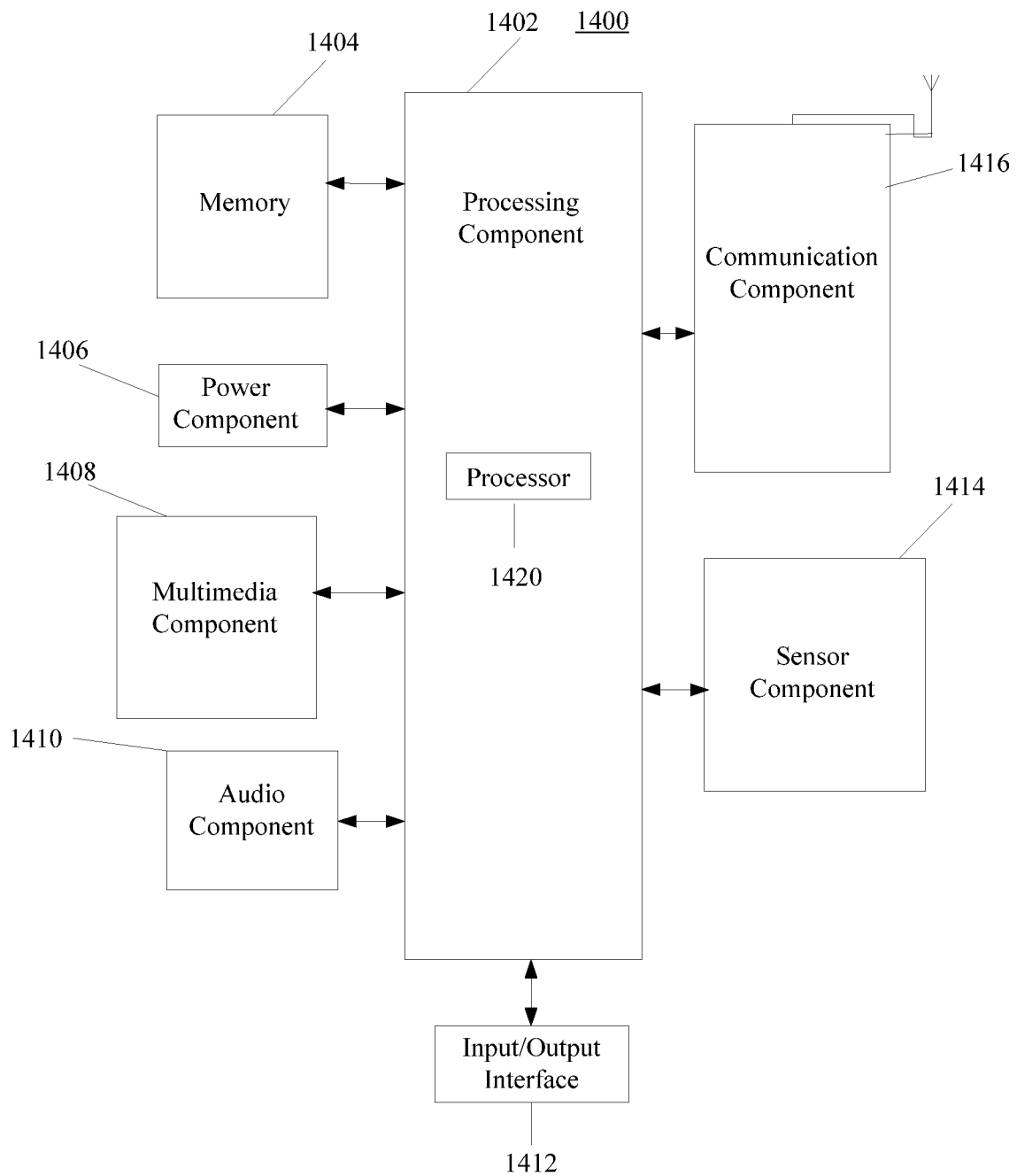
FIG. 14 is a block diagram illustrating a controlling apparatus applied to a self-balancing scooter according to an exemplary embodiment.

FIG. 14 is a block diagram showing an apparatus 1400 for controlling a self-balancing scooter according to an exemplary embodiment, which can be used in a terminal equipment. For example, the apparatus 1400 may be a mobile phone, a computer, a digital broadcast terminal, a message transceiver device, a game console, a tablet device, a medical equipment, a fitness equipment, a personal digital assistant, and the like.

Referring to FIG. 1400, the apparatus 1400 may include one or more of the following components: a processing component 1402, a memory 1404, a power component 1406, a multimedia component 1408, an audio component 1410, an input/output (I/O) interface 1412, a sensor component 1414, and a communication component 1416.

The processing component 1402 typically controls overall operations of the apparatus 1400, such as the operations associated with display, telephone calls, data communications, camera operations, and recording operations. The processing component 1402 may include one or more processors 1420 to execute instructions to perform all or part of the steps in the above described methods. Moreover, the processing component 1402 may include one or at least two modules which facilitate the interaction between the processing component 1402 and other components. For instance, the processing component 1402 may include a multimedia module to facilitate the interaction between the multimedia component 1408 and the processing component 1402.

The memory 1404 is configured to store various types of data to support the operation of the apparatus 1400. Examples of such data include instructions for any applications or methods operated on the apparatus 1400, contact data, phonebook data, messages, pictures, video, etc. The memory 1404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the apparatus 1400. The power component 1406 may include a power management system, one or at least two power sources, and any other components associated with the generation, management, and distribution of power in the apparatus 1400.

The multimedia component 1408 includes a screen providing an output interface between the apparatus 1400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 1408 includes a front camera and/or a rear camera. The front camera and the rear camera may receive an external multimedia datum while the apparatus 1400 is in an operation mode, such as a photographing mode or a video mode. Each of the front camera and the rear camera may be a fixed optical lens system or have focus and optical zoom capability.

The audio component 1410 is configured to output and/or input audio signals. For example, the audio component 1410 includes a microphone ("MIC") configured to receive an external audio signal when the apparatus 1400 is in an operation mode, such as a call mode, a recording mode, and a voice recognition mode. The received audio signal may be further stored in the memory 1404 or transmitted via the communication component 1416. In some embodiments, the audio component 1410 further includes a speaker to output audio signals.

The I/O interface 1412 provides an interface between the processing component 802 and peripheral interface modules, such as a keyboard, a click wheel, buttons, and the like. The buttons may include, but are not limited to, a home button, a volume button, a starting button, and a locking button.

The sensor component 1414 includes one or at least two sensors to provide status assessments of various aspects of the apparatus 1400. For instance, the sensor component 1414 may detect an open/closed status of the apparatus 1400, relative positioning of components, e.g., the display and the keypad, of the apparatus 1400, a change in position of the apparatus 1400 or a component of the apparatus 1400, a presence or absence of user contact with the apparatus 1400, an orientation or an acceleration/deceleration of the apparatus 1400, and a change in temperature of the apparatus 1400. The sensor component 1414 may include a proximity sensor configured to detect the presence of nearby objects without any physical contact. The sensor component 1414 may also include a light sensor, such as a CMOS or CCD image sensor, for use in imaging applications. In some embodiments, the sensor component 1414 may also include an accelerometer sensor, a gyroscope sensor, a magnetic sensor, a pressure sensor, or a temperature sensor.

The communication component 1416 is configured to facilitate communication, wired or wirelessly, between the apparatus 1400 and other devices. The apparatus 1400 can access a wireless network based on a communication standard, such as WiFi, 2G or 3G or a combination thereof. In one exemplary embodiment, the communication component 1416 receives a broadcast signal or broadcast associated information from an external broadcast management system via a broadcast channel. In one exemplary embodiment, the communication component 1416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1404, executable by the processor 1420 in the apparatus 1400, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium, when instructions in the storage medium are executed by a processor of the apparatus 1400, the apparatus 1400 is enabled to perform a method for controlling a self-balancing scooter, including: detecting a target navigation marker used for navigating the self-balancing scooter; and controlling the self-balancing scooter to travel according to the target navigation marker when the target navigation marker is detected.

In an embodiment, the detecting a target navigation marker used for navigating the self-balancing scooter includes: detecting a candidate marker on a road where the self-balancing scooter is located; obtaining attribute information of the candidate marker in response to the candidate marker being detected; and determining the target navigation marker according to the attribute information, wherein a similarity between the attribute information of the target navigation marker and predetermined attribute information is greater than a predetermined threshold.

In an embodiment, the target navigation marker includes at least one of a graphic navigation marker, an audio navigation marker, a video navigation marker and an infrared navigation marker; and the target navigation marker indicates at least one of a traveling direction and a traveling speed.

In an embodiment, the target navigation marker includes the graphic navigation marker, the self-balancing scooter is provided with a camera; and the detecting a target navigation marker used for navigating the self-balancing scooter includes: obtaining by the camera a road image of the road where the self-balancing scooter is located; and detecting the graphic navigation marker by performing recognition on the road image.

In an embodiment, the graphic navigation marker includes at least one of a navigation icon on the road, a navigation icon on a signpost and a navigation icon on a building near the road.

In an embodiment, the target navigation marker includes the navigation icon on the road, the navigation icon on the road including a navigation line on the road; and the attribute information includes at least one of location being set, color, length and width.

In an embodiment, the controlling the self-balancing scooter to travel according to the target navigation marker includes: controlling the self-balancing scooter to travel along the navigation line on the road.

In an embodiment, the controlling the self-balancing scooter to travel according to the target navigation marker includes: controlling the self-balancing scooter such that the target navigation marker is always presented in the road image.

In an embodiment, the controlling the self-balancing scooter to travel according to the target navigation marker includes: obtaining a travelling instruction according to the target navigation marker; and controlling the self-balancing scooter to travel according to the travelling instruction.

In an embodiment, the controlling the self-balancing scooter to travel according to the target navigation marker when the target navigation marker is detected includes: determining a final target navigation marker by at least one of the following selection manners of a navigation line when the self-balancing scooter travels to an target intersection and there are at least two target navigation markers at the target intersection; and controlling the self-balancing scooter to travel according to the final target navigation marker.

The selection of the navigation line may include following manners: the final target navigation marker is determined according to a preset travelling direction corresponding to the target intersection; or a selection instruction of travelling direction is received, and the final target navigation marker can be determined according to the selection instruction of travelling direction; or it is determined whether there is a prestored historical selected record of a navigation line; when there is a prestored historical selected record of a navigation line, the final target navigation marker can be determined according to the historical selected record of the navigation line.

Other embodiments will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present disclosure is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for controlling a self-balancing scooter, the method comprising:
    obtaining, by a camera of the self-balancing scooter, a road image of the road where the self-balancing scooter is located;
    detecting a graphic navigation marker by performing recognition on the road image; and
    controlling, by a processor of the self-balancing scooter, the self-balancing scooter to travel according to the graphic navigation marker, such that the road image obtained by the camera always includes the graphic navigation marker and the self-balancing scooter is navigated by the graphic navigation marker included in the road image;
    wherein when there are multiple target navigation markers at a target intersection, the method further comprises:
    determining whether there is a prestored historic selected record corresponding to the target intersection; and
    in response to that there is a prestored historic selected record corresponding to the target intersection, determining a historic navigation marker corresponding to the prestored historic selected record, and controlling the self-balancing scooter to travel according to the historic navigation marker.

2. The method according to claim 1, wherein the graphic navigation marker indicates at least one of a traveling direction and a traveling speed.

3. The method according to claim 2, wherein the graphic navigation marker comprises a navigation icon on the road.

4. The method according to claim 3, wherein the navigation icon on the road comprises a navigation line on the road.

5. The method according to claim 4, wherein the controlling the self-balancing scooter to travel according to the graphic navigation marker comprises:
    controlling the self-balancing scooter to travel along the navigation line on the road.

6. The method according to claim 1, wherein the controlling the self-balancing scooter to travel according to the graphic navigation marker comprises:
    obtaining a travelling instruction according to the graphic navigation marker; and
    controlling the self-balancing scooter to travel according to the travelling instruction.

7. An apparatus for controlling a self-balancing scooter, the apparatus comprising:
    a processor; and
    a memory configured to store an instruction executable by the processor;
    wherein the processor is configured to:
    obtain, by a camera of the self-balancing scooter, a road image of the road where the self-balancing scooter is located;
    detect a graphic navigation marker by performing recognition on the road image; and
    control the self-balancing scooter to travel according to the graphic navigation marker, such that the road image obtained by the camera always includes the graphic navigation marker and the self-balancing scooter is navigated by the graphic navigation marker included in the road image;
    wherein when there are multiple graphic navigation markers at a target intersection, the processor is further configured to:
    determine whether there is a prestored historic selected record corresponding to the target intersection; and
    in response to that there is a prestored historic selected record corresponding to the target intersection, determine a historic navigation marker corresponding to the prestored historic selected record, and control the self-balancing scooter to travel according to the historic navigation marker.

8. The apparatus according to claim 7, wherein the graphic navigation marker indicates at least one of a traveling direction and a traveling speed.

9. The apparatus according to claim 8, wherein the graphic navigation marker comprises a navigation icon on the road.

10. The apparatus according to claim 9, wherein the navigation icon on the road comprises a navigation line on the road.

11. The apparatus according to claim 10, wherein the processor configured to control the self-balancing scooter to travel according to the graphic navigation marker is further configured to:

control the self-balancing scooter to travel along the navigation line on the road.

12. The apparatus according to claim 7, wherein the processor configured to control the self-balancing scooter to travel according to the graphic navigation marker is further configured to:

obtain a travelling instruction according to the graphic navigation marker; and control the self-balancing scooter to travel according to the travelling instruction.

13. A non-transitory computer-readable storage medium having stored therein instructions that, when executed by a processor of a smart terminal device, causes the smart terminal device to perform a method for controlling a self-balancing scooter, the method comprising:

obtaining, by a camera of the self-balancing scooter, a road image of the road where the self-balancing scooter is located;

detecting a graphic navigation marker by performing recognition on the road image; and controlling, by a processor of the self-balancing scooter, the self-balancing scooter to travel according to the graphic navigation marker when the target navigation marker is detected, such that the road image obtained by the camera always includes the graphic navigation marker and the self-balancing scooter is navigated by the graphic navigation marker included in the road image;

wherein when there are multiple graphic navigation markers at a target intersection, the method further comprises:

determining whether there is a prestored historic selected record corresponding to the target intersection; and in response to that there is a prestored historic selected record corresponding to the target intersection, determining a historic navigation marker corresponding to the prestored historic selected record, and controlling the self-balancing scooter to travel according to the historic navigation marker.

14. The method according to claim 1, wherein the historic navigation marker is a most frequently used marker, a marker with a most number of used times or a most recently used marker.

15. The apparatus according to claim 7, wherein the historic navigation marker is a most frequently used marker, a marker with a most number of used times or a most recently used marker.

16. The storage medium according to claim 13, wherein the historic navigation marker is a most frequently used marker, a marker with a most number of used times or a most recently used marker.

* * * * *